United States Patent [19]

Melluish

[11] 4,171,153
[45] Oct. 16, 1979

[54] WEIGHT SYSTEM FOR GLASSES

[76] Inventor: James W. Melluish, 2318 Sheffield, Kalamazoo, Mich. 49008

[21] Appl. No.: 844,603

[22] Filed: Oct. 25, 1977

[51] Int. Cl.² ............................................. G02C 13/00
[52] U.S. Cl. ........................................ 351/158; 351/178
[58] Field of Search ................... 351/158, 178; 73/487

[56] References Cited

U.S. PATENT DOCUMENTS

| | | | |
|---|---|---|---|
| 2,697,345 | 12/1954 | Currier | 73/487 |
| 3,017,774 | 1/1962 | Thompson | 73/487 |

Primary Examiner—Paul A. Sacher

Attorney, Agent, or Firm—Blanchard, Flynn, Thiel, Boutell & Tanis

[57] ABSTRACT

A method and apparatus for fitting eyeglasses utilizing a lens-free frame having a frame front defining a pair of lens apertures and a pair of bows connected to the frame front. The method involves the steps of fitting a prospective wearer with a lens-free frame having lens apertures of a selected size. A mass is then selected having a weight which approximates the actual weight of the lens prescribed for the wearer. The actual weight of the lens which is to be positioned in the frame is then simulated by removably attaching the mass to the frame in the vicinity of the lens aperture.

11 Claims, 4 Drawing Figures

WEIGHT SYSTEM FOR GLASSES

FIELD OF THE INVENTION

This invention relates to an improved method and apparatus for fitting eyeglasses so that the wearer will be able to accurately assess the weight, fit and comfort of the glasses during the initial fitting.

BACKGROUND OF THE INVENTION

The fitting of eyeglasses so as to result in maximum comfort to the wearer has long presented a problem to opticians and the like. The usual practice of fitting glasses involves the utilization of sample frames from which the lenses are missing, which sample frames are fit on the wearer to permit sizing and selection of the proper frame. This fitting technique, even though utilized for many years, has nevertheless been recognized as possessing serious deficiencies with respect to simulating the resulting comfort of the eyeglasses after they have been fitted with lenses. Since the lenses add substantial weight, merely fitting the wearer with empty frames, such as is the general practice, does not properly simulate the actual weight of the eyeglasses after the lenses have been installed therein. Thus, opticians often experience the complaint that the finished eyeglasses are uncomfortable due to the extreme weight thereof and the excessive pressures which they impose, particularly on the nose.

The above problem, even though long-standing, has become even more acute in recent years in view of the increasing usage of eyeglasses involving large frames and large lenses. These large frames themselves are substantially heavier and, in view of the large increase in the surface area of the lenses, the lenses themselves are also substantially heavier. Thus, the resulting finished eyeglasses are often of such weight that the wearer discovers that he is unable to tolerate the weight of the glasses and particularly the pressure which they impose on the nose.

The difficulty of attempting to simulate the weight of the completed eyeglasses is further complicated by the fact that the final weight of the glasses depends upon not only the size (that is, the lens area) of the selected frame, but also the prescription (that is, the thickness) of the lenses. A further factor entering into the selection and resulting weight of the glasses is that lenses are now available in a choice of either glass or plastic, with the normal 2 mm thick glass lenses having a weight approximately twice that of an identical plastic lens. However, while plastic lenses have been available for many years and are widely utilized, nevertheless plastic lenses are still not readily accepted by many wearers since such lenses are admittedly more subject to surface scratching. Because of this, many wearers resist the purchase of plastic lenses, even though the optician may suggest the utilization of plastic lenses so as to minimize the weight of the eyeglasses and thereby improve wearer comfort.

In many such cases, it has been observed that the wearer discovers that the weight is unacceptable after having worn the eyeglasses for a limited period of time, and then returns same to the optician so as to have the glass lenses replaced with plastic lenses. In situations of this type, this replacement is normally done as a service by the optician at no additional charge to the wearer, so that the optician has to absorb the cost of the extra set of lenses, and in addition has to provide additional services.

Accordingly, it is an object of the present invention to provide a method and apparatus which facilitates the fitting of eyeglasses so as to effectively overcome the above shortcomings. More specifically, it is an object of the present invention to provide:

1. A method of fitting eyeglasses, as aforesaid, which utilizes a system of masses which can be readily attached to a frame so as to simulate the weight of the lenses which are to be fitted in the frame, whereby the initial fitting permits the wearer to more accurately evaluate the weight and comfort of the finished eyeglasses.

2. A method, as aforesaid, wherein a plurality of different sized masses are provided and can be selected pursuant to a chart which takes into account both the size (area) and prescription (thickness) of the lenses, whereby the masses can be accurately selected to represent the weight of the finished lenses.

3. A method, as aforesaid, wherein a pair of masses are positioned on the frame during the fitting, one mass being positioned on each bow adjacent the hinged connection thereof to the frame front, whereby the mass is positioned to accurately simulate the weight of the lens.

4. An apparatus for carrying out the aforesaid method, wherein the apparatus includes a series of masses having weights of graduated magnitude, which weights represent the range of weights commonly encompassed by lenses which fall within the normal range of sizes and prescriptions.

5. An apparatus, as aforesaid, wherein two identical masses are provided for each graduation of the series so that an individual mass representative of the weight of each lens can thus be positioned on each bow of the frame during fitting, whereby each mass simulates the weight of the lens which is to be positioned in the adjacent lens opening.

6. An apparatus, as aforesaid, wherein the masses are provided with a suitable clip or other attachment structure which permits the masses to be easily and quickly mounted on or removed from the lens-free frame.

7. An apparatus, as aforesaid, wherein there is provided a suitable chart which represents the size and prescription of typical lenses so as to permit the optician to readily equate same to an equivalent mass for use in fitting the eyeglasses.

8. A method and apparatus, as aforesaid, which permits the optician to provide simple comparison between plastic and glass lenses, in terms of resulting wearer comfort, by interchanging different masses on the frame so that the wearer can appreciate and sense the difference in comfort achieved when utilizing plastic lenses rather than glass lenses.

Other objects and purposes of the invention will be apparent to persons familiar with this technology and the problems encountered therein, upon reading the following specification and inspecting the accompanying drawing.

Figure 1:
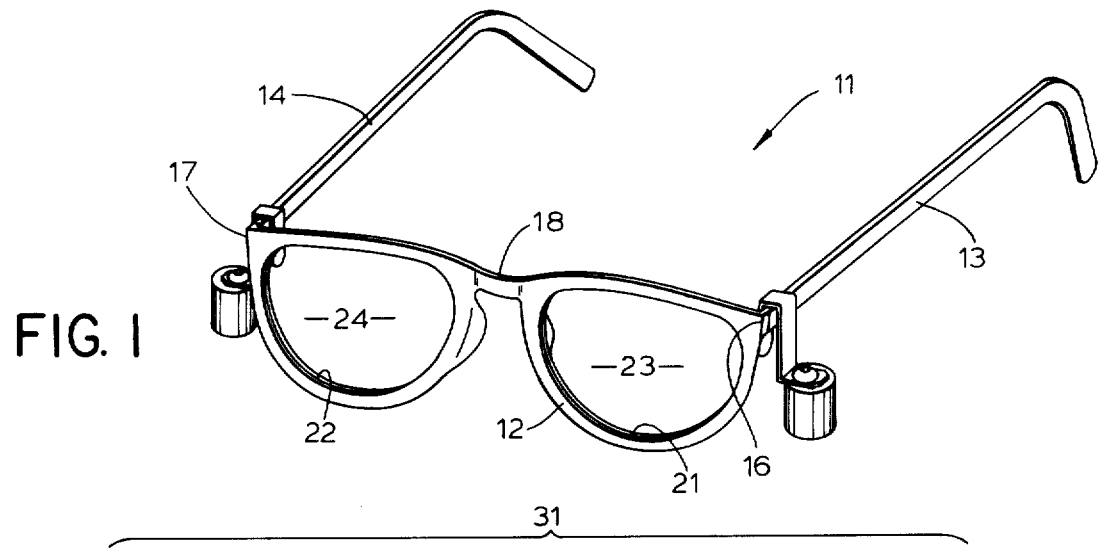
FIG. 1 is a perspective view of a typical frame for a set of eyeglasses and showing the attachment of masses thereon according to the method and apparatus of the present invention.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the frame or weight and designated parts thereof. Said terminology will include the words specifically mentioned, derivatives thereof and words of similar import.

DETAILED DESCRIPTION

In computing the weight of a lens, there are five factors which should initially be considered. These are the lens style (shape), the lens size, the lens power, the lens material (plastic or glass) and the minimal lens thickness. Of these five factors, the lens style has been determined as being the least critical since most manufacturers make only a limited number of styles and, for any specified size, the various styles are of very similar surface areas. Thus, the style can generally be ignored in determining lens weight, and is ignored in the present invention.

Considering the other factors, the lens size is the horizontal width dimension measured across the face of the lens, which dimension is normally expressed in millimeters. For typical lenses, the normal lens size ranges from a minimum 44 millimeters to a maximum of 58 millimeters. Since the area of a lens is almost directly proportional to the size, irrespective of the lens style as noted above, the lens size is thus one of the critical factors involved in determining the lens weight.

A further critical factor in determining lens weight is the lens thickness, normally expressed as the lens power. When an opthamologist or optometrist prescribes a corrective lens, the lens power is normally defined in two parts, one being the "spherical power" which defines a spherical curvature applicable to all meridian planes, and the other being the "cylindrical power" which defines a spherical curvature in only a single meridian plane, with this curvature decreasing away from this plane. Thus, to accurately determine the equivalent thickness of the lens, one must consider both the spherical and cylindrical powers. It has been well recognized that the equivalent thickness of a lens can be expressed by the following formula: equivalent spherical power = spherical power + $\frac{1}{2}$ cylindrical power. This equation, defines an equivalent spherical power which is representative of lens thickness, thereby permitting an accurate determination of lens weight.

The remaining factors mentioned above, namely the lens material and the minimal lens thickness, must also be considered in determining lens weight. These factors are considered in calculating typical weights, the values of which will be represented in charts as explained hereinafter.

Referring now to FIG. 1, same diagrammatically illustrates a typical eyeglass frame 11 having a frame front 12 and a pair of bows 13 and 14, the latter being respectively hingedly connected to the opposite corners of the frame front by hinges 16 and 17. The frame front, which includes a central nose portion 18 conventionally referred to as the bridge, defines a pair of lens openings 21 and 22 which respectively receive suitable lenses 23 and 24. The lenses 23 and 24 can be identical but, more typically, are normally of different powers.

Since the weight of eyeglasses is significantly affected by the weight of the lenses, the present invention permits the weight of the lenses 23 and 24 to be accurately simulated during the initial fitting of an empty frame 11 so as to permit the wearer to readily evaluate the comfort of the eyeglasses, both with respect to the pressure which they apply on the wearer's nose, and with respect to the ability to retain the glasses properly positioned on the nose without encountering slippage. For this purpose, the present invention provides a set of masses consisting of several pairs of individual masses which are of stepped progressively increasing weight magnitudes so as to simulate the typical weights of lenses within the conventional range of sizes and powers.

Figure 2:
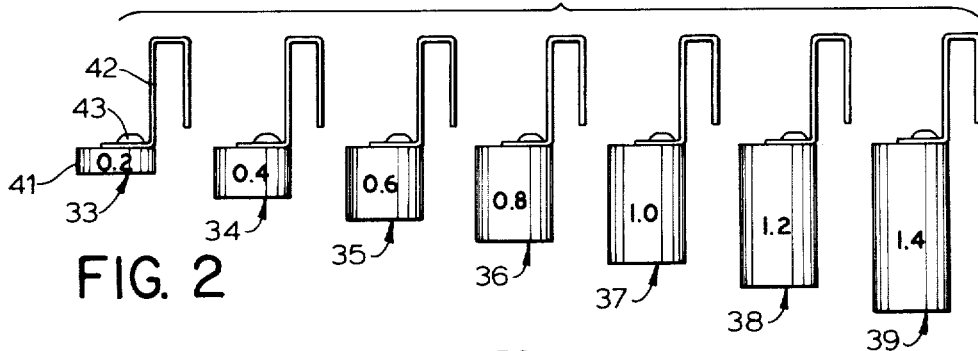
FIG. 2 illustrates a set of masses adapted for attachment to a frame.

As illustrated in FIG. 2, the mass set of the illustrated embodiment has been designated 31 and includes seven pairs of individual masses, the masses of each pair being identical, and the masses of said seven pairs being designated 33–39. The individual masses of each pair are of progressively increasing weight, with the individual masses 33 being the lightest, and the masses being of progressively increasing weight so that the masses 39 are the heaviest. For example, it has been experimentally determined that one selected set of weights for these masses would be as follows: mass 33, 0.2 ounce; mass 34, 0.4 ounce; mass 35, 0.6 ounce; mass 36, 0.8 ounce; mass 37, 1.0 ounce; mass 38, 1.2 ounce; mass 39, 1.4 ounce. As indicated above, the masses are of progressively increasing weight, with a uniform differential of 0.2 ounce between the masses of each adjacent pair.

The individual masses are preferably of a minimum size, and additionally have an attachment structure associated therewith to permit the masses to be readily mounted on or removed from the frame during the fitting process. The mass itself is thus preferably of a dense material, such as metal, so as to occupy a minimum volume. In the illustrated embodiment, each mass is constructed as a metal cylindrical body 41 which thus permits it to have a minimum size while at the same time facilitating its handling and storage. The body 41 is provided with an attachment structure 42 for permitting the mass to be mounted on the frame, which attachment structure is particularly designed to enable the mass to be mounted on the bow of the frame adjacent the hinge. This illustrated attachment structure comprises a downwardly opening U-shaped member which has one leg thereof fixed to the body 41, as by a rivet 43, whereby the downwardly opening member 42 can be hooked over the bow 13 or 14 in the vicinity of the respective hinge.

Figure 3:
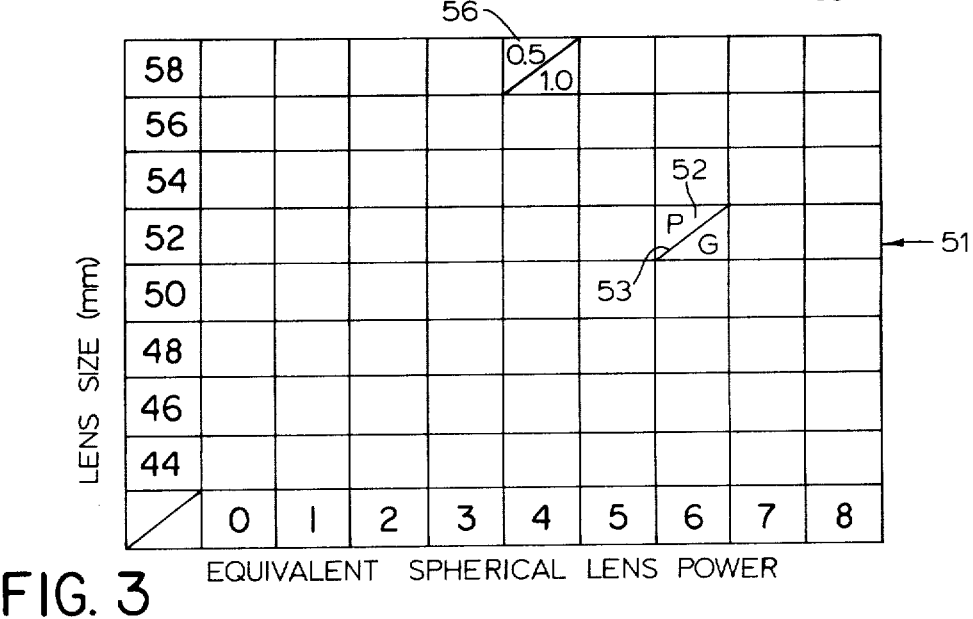
FIG. 3 illustrates a typical chart which displays lens size and equivalent spherical lens power so as to permit selection of a proper mass which represents the actual weight of either a glass or plastic lens.

In addition to the set of masses 31 as described above, the present invention also involves the use of a chart for determining the appropriate mass depending upon the size and equivalent spherical power of the lens. FIG. 3 diagrammatically illustrates a chart 51 which illustrates the principle of the present invention. It will be appreciated that the actual numerical values which are inserted into this chart will be experimentally determined based upon the desired range of lens sizes and equivalent spherical powers. For purposes of illustration, the chart 51 lists on the abscissa thereof equivalent spherical powers ranging from 0 to 8, with the powers being defined in intervals of one, which range is believed to be a typical equivalent spherical power range for practicing the present invention. The ordinate of the chart 51 lists thereon the typical size range of lenses, namely from 44 to 58 millimeters, with the chart interval being two millimeters, which is also typical of lens sizes.

The individual squares within the chart 51, such as the square 52, can be suitably divided (such as by the diagonal line 53) so as to permit each square of the chart to represent a first weight value P which simulates a plastic lens and a second weight value G which simulates an equivalent glass lens. The value for G will typically be twice that of P since glass lenses are typically twice as heavy as equivalent plastic lenses.

While two separate charts can be provided, one containing the P values and the other containing the G values, it is believed more convenient to provide both of these values on a single chart.

Figure 4:
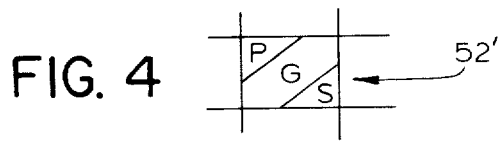
FIG. 4 illustrates a modification of the chart shown in FIG. 3.

In addition, a further chart can also be provided so as to represent the mass magnitudes for use with industrial safety glass, this additional chart also being includable within the chart 51. For example, FIG. 4 illustrates therein a modification of the chart 51 and particularly an individual square 52'. This square has been appropriately divided so as to represent three values, the upper left corner of the square again containing the P value, the center portion of the square containing the G value, and the lower right corner of the square containing the S value which represents the weight of an equivalent lens formed from industrial safety glass. Since a lens of industrial safety glass (3 mm thickness) is typically 2.5 times heavier than an equivalent plastic lens, the P, G and S values for any one square will typically be in the weight ratio of 1:2:2.5.

OPERATION

To utilize the method and apparatus of the present invention, the optician will first fit the wearer with an empty (i.e., lens-free) frame 11 of the wearer's choosing, which frame will have lens openings of a selected size. The optician will then position two selected masses from the set 31 on the bows 13 and 14 adjacent the frame front, which masses will be individually determined from the chart 51 by an evaluation of the frame size and equivalent spherical power of the individual lenses. The two selected masses which are suspended on the frame can then be interchanged between the heavier and lighter masses indicated by the chart 51 so as to simulate the weight of both glass and plastic lenses. The prospective wearer can thus more accurately sense and evaluate the effective weight of the complete eyeglasses so as to determine their comfort.

To insure a more complete understanding of this process, a typical example utilizing the present invention is as follows:

Assuming for purposes of example that the prescription for the lense 23 is +5.0 spherical power and −2.0 cylindrical power, the optician then calculates the equivalent spherical power from these values which, being the algebraic sum of the spherical power and ½ the cylindrical power, results in an equivalent spherical power of 4.0 (computed by adding 5+½ (−2)). This equivalent spherical power value of 4.0 is then selected as the abscissa on the chart 51. Assuming that the prospective wearer has selected a lens size of 58 millimeters, then this is utilized as the ordinate, so that the intersection of these selected values results in the weight values which appear in the square 56, namely a weight value of 0.5 ounce for a plastic lens having this prescription, and a weight value of 1.0 ounce for a glass lens having this prescription. The optician can then select the mass 37 (which is 1.0 ounce) and hang same on the bow 13 directly adjacent the hinge 16, whereby this mass will accurately simulate the actual weight of a glass lens 23 having the desired prescription.

In the same manner, the optician will determine the proper weight for the other lens 24, and the selected mass which simulates the weight of the lens will similarly be hung on the bow 14 adjacent the hinge 17. With these two selected masses on the empty frame, the wearer thus will sense and feel a weight which accurately simulates the actual weight of the frame when glass lenses are mounted therein. The wearer can thus accurately determine the pressure imposed by the frame on his head, particularly on the nose, and can likewise determine if the eyeglasses will comfortably fit his nose and not slip down therealong.

After having simulated the weight of glass lenses as described above, the optician can then remove the masses from the lens and then position thereon the previously determined masses which simulate equivalent plastic lenses, such as one of the masses 34 or 36 which are closest to the 0.5 ounce value, whereupon the prospective wearer can thus evaluate the fit and comfort of the same frame having plastic lenses therein. In this manner, the wearer is able to make a more thorough evaluation as to whether he wishes either plastic or glass lenses, which evaluation takes into account the actual comfort and weight of the frame after having the appropriate prescription lenses mounted therein.

A further advantage of the above procedure is that it enables the prospective wearer to decide whether he wishes to have a frame of the selected size, or whether he wishes to utilize a smaller frame so as to minimize the lens weight. If the prospective wearer decides that the frame with the larger lenses is too heavy, as a result of the tests described above, he can then select a frame of smaller size and the optician can then recompute the weight of plastic and glass lenses. The above-described procedure is then repeated so as to enable a more accurate evaluation as to the comfort of these smaller frames when having prescription lenses therein, whether of glass or plastic.

The procedure described above is also applicable when considering industrial safety glasses, only in this case the weight values for safety glasses are the values S as illustrated in FIG. 4.

It will be readily evident that, in situations where the equivalent spherical value is not a whole number, then the optician will select the chart value which is closest to the computed value.

The present invention is not limited to the specific shape and configuration of the illustrated masses, nor to the specific values and layout of the chart, since it will be readily appreciated that these features can be substantially changed without affecting or departing from the basic method and structure of the present invention. The weight values as appearing in the chart are preferably initially experimentally determined by an actual weighing of several typical lenses for each equivalent spherical power, with an average of these experimental weight measurements then being used as the average actual weight for such lenses, whereupon the values appearing in table 51 are then selected according to the actual weight increments utilized for the masses so as to be closest to the actual average weight.

The masses can obviously be positioned at some other location on the frame, although it is desirable to position these masses as close to the lens openings as possible so as to more accurately simulate the actual lens weight. Positioning the masses on the bows, directly to the side of the lens openings, is preferred since the masses thus do not interfere with vision through the lens openings. However, depending on the design of the masses, they can be positioned directly on the frame front, such as being clipped on the upper element of the frame front either directly over the lens openings or closely adjacent the bridge. Such modifications are within the scope of the present invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of fitting eyeglasses utilizing a lens-free frame having a frame front defining a pair of lens apertures and a pair of bows connected to the frame front, comprising the steps of:
   fitting a prospective wearer with a lens-free frame having lens apertures of a selected size;
   determining a simulated weight value which represents the weight of the prescribed lens by considering the size of the selected lens aperture and the power of the prescribed lens;
   selecting a mass having a weight approximately equal to the simulated weight value representing the actual weight of the prescribed lens; and
   simulating the actual weight of the prescribed lens which is to be positioned in the frame by removably attaching said selected mass to said frame in the vicinity of the lens aperture.

2. A method according to claim 1, including the step of calculating an equivalent spherical power for the prescribed lens by utilizing a value which is the algebraic sum of the actual spherical power plus one-half the actual cylindrical power for the prescribed lens, and then utilizing the lens size and the calculated equivalent spherical power for determining said weight value.

3. A method according to claim 2, including the step of selecting two said masses and positioning one of said masses adjacent one lens aperture so as to simulate the weight of the lens prescribed for this aperture, and positioning the other mass closely adjacent the other lens aperture for simulating the weight of the lens prescribed for said other aperture.

4. A method according to claim 3, including the step of mounting each of said masses on the bow which is positioned most closely adjacent the respective lens aperture in the vicinity of the hinged connection between the bow and the frame front.

5. A method according to claim 3, including the step of providing a series of pairs of masses with the weights of each pair being identical, and with the weights of the different pairs being of different magnitude for simulating the effective weight of lenses over a substantially wide range of sizes and powers.

6. A method according to claim 5, including the step of providing at least one chart which represents a typical range of lens sizes and powers for permitting a rapid determination of a weight value which simulates the actual lens weight by utilizing the lens size and lens power for reading the chart.

7. A method according to claim 6, wherein the chart includes a first set of weight values representing the weight of glass lenses, and wherein the same or a further chart includes a second set of weight values representing the weight of plastic lenses.

8. A method according to claim 2, including the step of providing at least one chart which represents a typical range of lens sizes and powers for permitting a rapid determination of a weight value which simulates the actual lens weight by utilizing the lense size and lens power for reading the chart.

9. An apparatus for permitting the fitting of eyeglasses utilizing a lens-free frame so as to enable the simulation of the weight of the prescribed lenses which are to be fit into the lens apertures of the frame, said apparatus comprising:
   a set of discreet and individual masses, said set including a plurality of pairs of said masses with the masses of each pair being of identical weight, and each of said pairs having a weight different from that of any other pair, whereby said set of masses defines a range of weights which increase in selected steps;
   each of said masses having attachment means mounted thereon for permitting the mass to be removably mounted on said frame; and
   chart means for selecting one of said masses which is approximately equivalent to the actual weight of the lens which is prescribed for the lens aperture of said frame, said chart means having ordinate and abscissa values which extend over a selected range, one of said values representing the lens size and the other of said values representing the lens power, and a set of weight values positioned within a substantially rectangular grid as defined by said abscissa and ordinate values, said weight values representing the approximate weight of an actual lens having the selected abscissa and ordinate values.

10. An apparatus according to claim 9, wherein the rectangular grid of said chart means includes two sets of approximate weight values, one representing the weight values for a glass lens, and the other representing the weight values for a plastic lens.

11. An apparatus according to claim 10, wherein said attachment means comprises a hook structure which enables the mass to be releasably hooked onto the frame.

* * * * *